Figure 1:
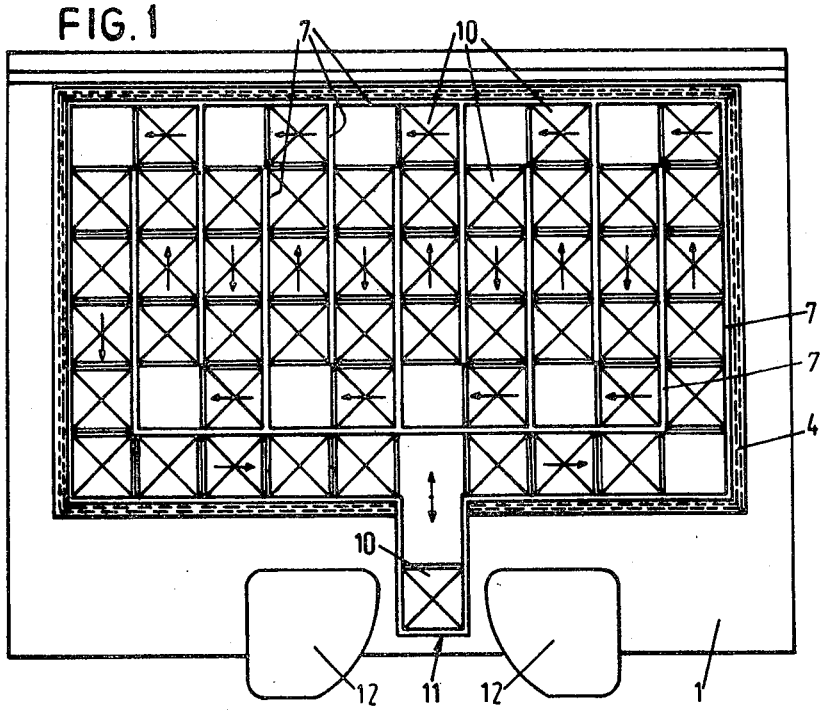

United States Patent [19]
Baghuis

[11] 3,976,289

[45] Aug. 24, 1976

[54] ASSEMBLY TABLES

[75] Inventor: Ludovicus Hendrikus Baghuis, Maria van Bourgondiesingel 's-Hertogenbosch, Netherlands

[73] Assignee: IVA Gebr. Ten Vaarwerk B.V., Beek, Netherlands

[22] Filed: Feb. 25, 1975

[21] Appl. No.: 552,963

[52] U.S. Cl. ................................. 269/56; 198/19
[51] Int. Cl.² ........................................ B23Q 1/04
[58] Field of Search ............ 269/55, 56, 71; 198/19, 198/218, 195

[56] References Cited
UNITED STATES PATENTS

| | | | |
|---|---|---|---|
| 2,640,604 | 6/1953 | DeBurgh | 198/19 |
| 2,829,566 | 4/1958 | Gecks | 269/55 |
| 2,999,579 | 9/1961 | Kostrzewa | 198/19 |
| 3,068,987 | 12/1962 | Franklin | 198/19 |

*Primary Examiner*—Al Lawrence Smith
*Assistant Examiner*—Robert C. Watson
*Attorney, Agent, or Firm*—John P. Snyder

[57] ABSTRACT

An assembly table for precision mechanisms having a removable table top provided with a plurality of supporting blocks for the parts of such mechanisms, said blocks being mounted for stepwise movement in an endless path in said table top, the latter being so supported by a base frame provided with the main driving means for said blocks, as to permit its easy removal from and mounting on said frame together with said blocks.

12 Claims, 9 Drawing Figures

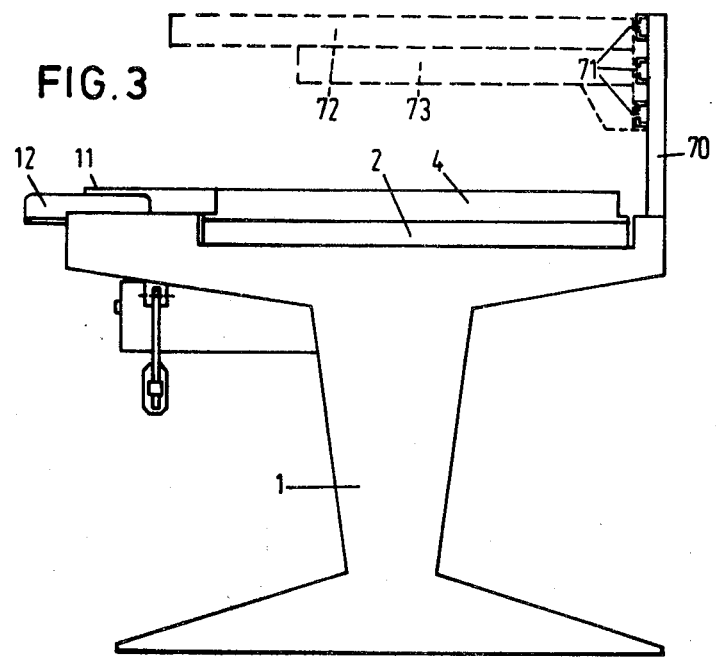
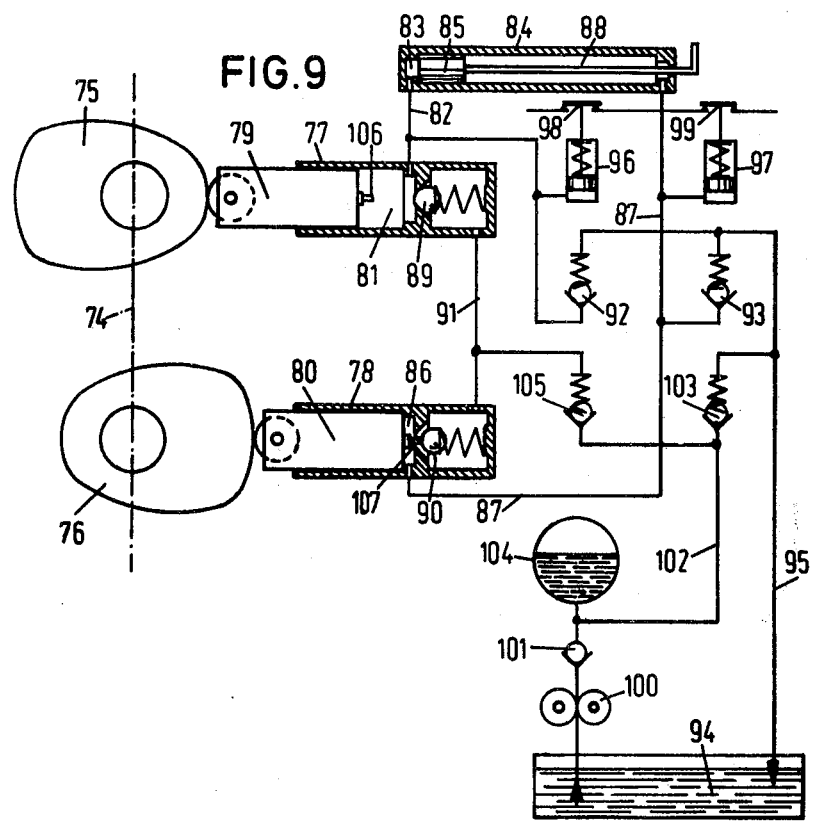

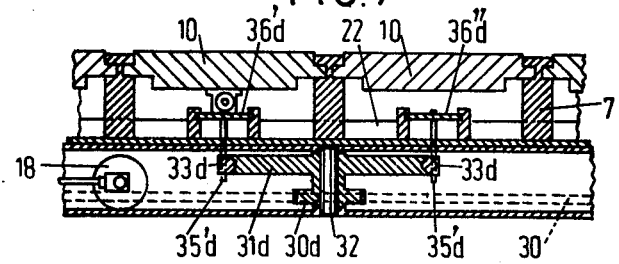
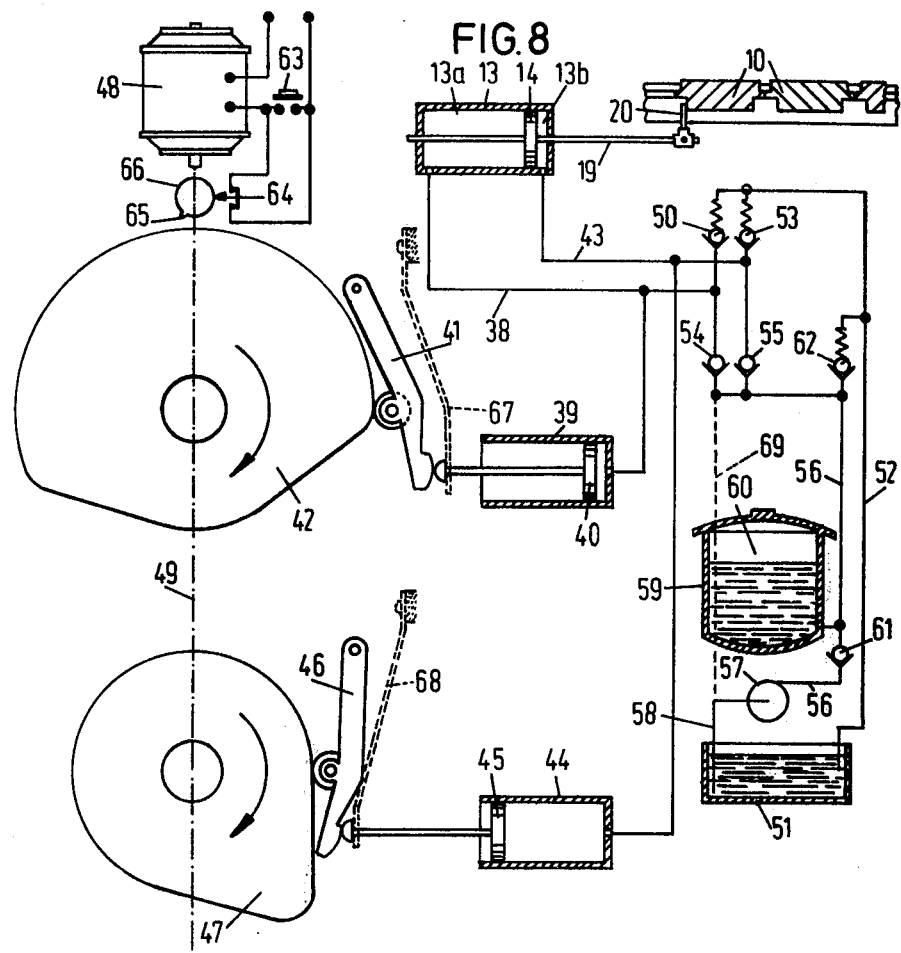

ASSEMBLY TABLES

The invention relates to an assembly table for precision products, comprising a base frame and a table top which is provided with a plurality of supporting blocks adapted to move stepwise in an endless path and to pass, one after the other, at least one station, where the products carried by a supporting block are assembled or where work is done on one or more of these products.

Assembly tables of this kind are used in the watch industry, in factories for the manufacture of photographic apparatuses measuring instruments and other precision products and in workshops for the construction of electronic devices. Such assembly tables may be provided with dozens of supporting blocks which are brought, one after the other, in front of the seat of an assembler and/or in a station, where automatically performed work, such as automatic welding, soldering or riveting, is done. Mounted on said supporting blocks are work blocks which are adapted to the work to be done and/or to carry objects and carry objects or components, with which or on which work has to be done. If all supporting blocks have travelled once or more times round the path they must be re-equipped with components carrying work blocks.

The invention has for its object to provide an assembly table which, after all work blocks have delivered their components and/or after the required work on objects lying thereon has been done, can be re-equipped in a short time and also permits that a set of work blocks for a different program is quickly mounted. According to the invention this is achieved in that the supporting blocks are mounted for sliding along guides in the table top, the table top together with the supporting blocks rests on the base frame in such manner, as to permit its easy removal and mounting, and the means for driving the supporting blocks are mainly provided in the base frame and are coupled with the supporting blocks by easily engageable and disengageable coupling members. Consequently, according to the invention the entire table top with the supporting blocks can be removed from the base frame and taken to a place, where the supporting blocks are re-equipped with objects carrying work blocks, or placed on an other table base frame, where other work is done, while an other table top with equipped work blocks is placed on the first mentioned table base frame. In that case the interruption of labour is reduced to a minimum. Since the entire table top with the supporting blocks can be removed from the table base frame and replaced by another one the supporting blocks may also be the work blocks.

Advantageously the assembly table may be so constructed that the supporting blocks are driven by hydraulic cylinders with pistons which are mounted in a separate intermediate frame provided in an easily detachable way between the base frame and the table top with the supporting blocks and the part of the hydraulic system comprising all means for supplying and controlling said cylinders is accommodated in the base frame. The table top with the supporting blocks and the cylinders with pistons for driving said blocks then may be replaced by a table top with supporting blocks which move in an other path or have other dimensions and the cylinders with pistons required therefor.

Slide-valves for controlling the cylinders in the right order of succession can be avoided, when each active space of the cylinders provided in the intermediate frame is connected through an individual conduit to an individual cylinder accommodated in the base frame and provided with a piston which is driven by a cam disc and all cam discs are driven by a common electromotor. When in that case the phase angles between the cam discs have been well chosen or if, at the use of fixed phase angles between said discs, the connections between the cylinders with the cam driven pistons and the cylinders provided with the pistons which are coupled with the supporting blocks have been well chosen, the movements of said blocks and other operations, if any, ordered by the cam discs can take place in the correct order of succession.

A simple construction is possible if the table top includes longitudinally slidable bars mounted for reciprocation and each carrying at least one catch which is adapted to be coupled with a supporting block for moving on one supporting block or a number of supporting blocks at the same time, each one of said bars being coupled by a coupling member with the piston of a cylinder mounted in the intermediate frame. Such a coupling member may be a vertical pin attached to a piston rod and engaging a hole of such a bar.

It is advantageous to construct the endless path of the supporting blocks in such a way that it extends within a rectangle except at the site of a station and at this site projects at right angles from the leg of said rectangle which faces said station. In that case the endless path of the supporting blocks may advantageously consist within said rectangle of a meander-shaped first section extending parallel to a leg of the rectangle and of a straight second section extending also parallel to said leg of the rectangle and interconnecting the ends of said first section and at the site of a station of a straight third section projecting from said rectangle in a direction at a right angle to said second section. Such a path makes the number of supporting blocks which can be placed on a given table top area a maximum and requires only a relatively small number of cylinders to move on said blocks.

It is recommended to provide the base frame with fittings having means for the detachable fastening above the table top of bins or an auxiliary table top with auxiliary blocks adapted to be moved in an endless path and functioning to deliver components and/or tools to the operator. In latter case the objects to be assembled can be passed by the supporting blocks of the table top and the components therefor can be passed by the auxiliary blocks of the higher positioned auxiliary table top to a station.

In many cases a hydraulic driving system including the above mentioned cam driven pistons is preferred, in which the active space of each cylinder comprising a piston driven by a cam disc is connected to a feed circuit kept under a predetermined over-pressure through a conduit provided both with a check-valve which closes towards said cylinder space and is opened by said piston at the end of its active stroke and with a second check-valve which closes towards said feed circuit and the force of the spring on which is weaker than the oppositely directed force exerted thereon by the pressure of the liquid in a feed circuit. Since in this system the first mentioned check-valve is forced open at the end of each active stroke of the respective piston, liquid from the feed circuit will be supplied through the conduit provided with the two oppositely operating check-valves to the part of the circuit controlled by said piston, should liquid be discharged from the said part of the circuit through the over-pressure valve, due to leakage or during an unexpectedly high pressure shock. This has the effect that deviations of the position of the piston to move supporting and/or work blocks from the analog position of the cam driven piston are corrected after each stroke. The pressure in the feed circuit may be kept relatively low, since it need not be higher than the pressure which is necessary to move on the supporting and/or work blocks during normal operation. Lower pressures in the hydraulic system result in less load on the active surfaces of cam discs, rollers and shafts, which cause less wear and lower temperatures due to friction, because at lower pressures the cylinders, pistons and piston rods may fit less accurately.

Figure 2:
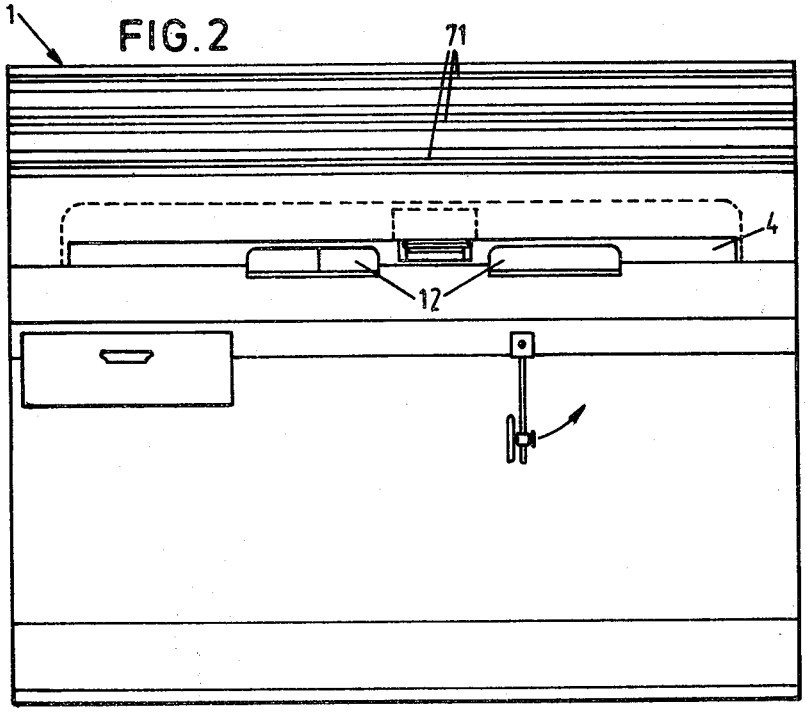
Figure 4:
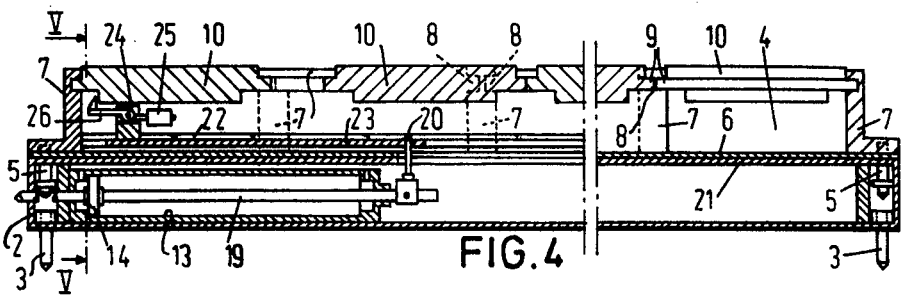
Figure 5:
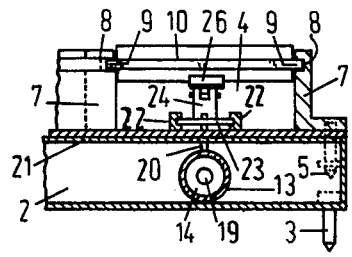
Figure 6:
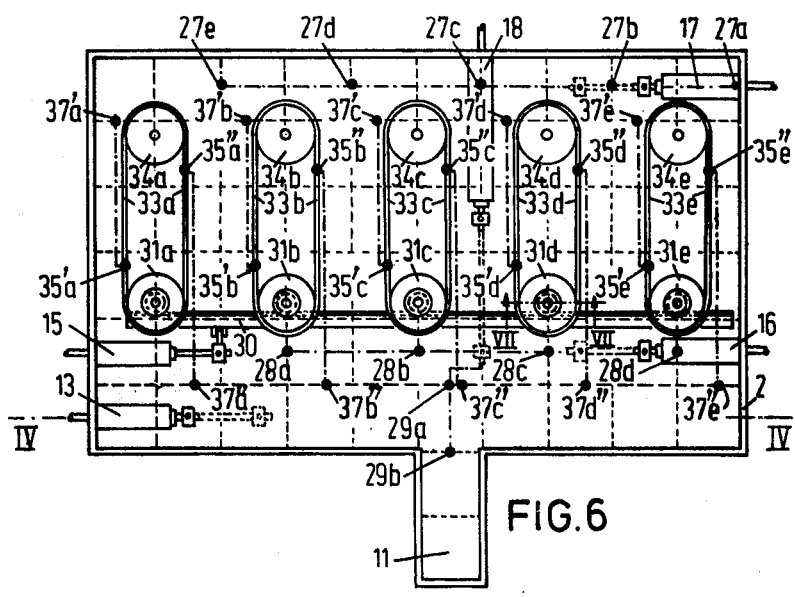

The invention will be further elucidated with the aid of the drawing. In the drawing is:

FIG. 1 is a plan view of an assembly table according to the invention,

FIG. 2 an elevational view of the front of said table,

FIG. 3 an elevational view of a side of said table,

FIG. 4 on a larger scale a portion of a vertical sectional view taken on line IV—IV in FIG. 6 of a box-shaped table top and a frame of the assembly table shown in FIGS. 1, 2, 3, FIG. 5 on the same scale as FIG. 4 a portion of a vertical sectional view taken on line V—V in FIG. 4, FIG. 6 a diagrammatical plan view on the smaller scale of FIGS. 1, 2, 3 of a frame provided with a hydraulic driving mechanism which is mechanically coupled with supporting blocks serving at the same time as work blocks of the assembly table, FIG. 7 on the larger scale of FIGS. 4 and 5 a portion of a vertical cross sectional view taken on line VII—VII in FIG. 6, FIG. 8 a part of a hydraulic circuit for the assembly table shown in FIGS. 1–7 and FIG. 9 a part of an other hydraulic circuit for said assembly table.

In the drawing is a table base frame designated by 1, which supports a detachable intermediate frame 2 kept in place by pins 3 which engage holes provided in the base frame (see FIG. 4). Supported by said intermediate frame 2 is a detachable box-shaped table top 4 which is also locked against horizontal movement by pins 5 engaging holes of said intermediate frame.

The box-shaped table top 4 is provided with a bottom plate 6, vertical ledges 7 mounted thereon and having horizontal guiding grooves 8 and with a plurality of supporting blocks 10 having ribs 9 which engage said grooves 8 and are adapted to be moved along said ledges. Said supporting blocks 10 carry the objects to be assembled and/or the components therefor. Although it is possible that on each supporting block a separate work block carrying the respective objects and/or components is mounted, in the present assembly table the supporting blocks are at the same time the work blocks. It is shown in FIG. 1 that these combined supporting-work blocks are moved stepwise in a meandering endless path within the rectangle formed by the detachable table top. This path comprises a first section which meanders toward and away from the front side of the table from the right-to the left-hand side of FIG. 1 and which section covers a region which is parallel to but displaced rearwardly from the front side of the assembly table. The path further includes a straight second section extending parallel to and at said front side of the table and interconnecting the ends of the first section, whereas said path also has a third section extending at right angles to said second section and projecting from the front side of said rectangle. This third section of the path is meant to guide each time a supporting block from the second section of the path towards a station 11 which is in reach of a worker sitting in front of the table and for whom arm-rests are provided on the base frame 1.

As will be evident from FIG. 1, those guide members 7 which are within the confines of the rectangular area defined by the outer guide members are in the form of a comb facing the rear side of the table and a number of guide members projecting from the rear side of the table and interdigitated with the "teeth" of such comb. This arrangement defines the meandering first path section as well as the second section, the first section joining, at its opposite ends, with the right- and left-hand ends of the second section. There are fewer supporting blocks than spaces to accommodate them. Thus, in FIG. 1, the second section has an empty space at its right-hand end, the center space being only temporarily empty while a block is at the work station 11. In the first or meander section, only every other space starting from the right-hand end of the upper row of FIG. 1 is filled and in the fifth row from the top of FIG. 1 certain of the spaces are empty so that, expecting the completely-filled right-hand column of the second section, the top spaces of the second, fourth, sixth, eighth and tenth columns are empty whereas the bottom spaces of the third, fifth, seventh and ninth columns are empty. As is detailed later, when the block at the work station has been returned to the second section, the entire second section is shifted one space to the right while those blocks at the tops of the aforesaid first, third, fifth, seventh and ninth columns as well as those blocks at the bottoms of the aforesaid second, fourth, sixth and eighth columns are shifted one space to the left. Thereafter, these blocks in the aforesaid first column plus that block at the right-hand end of the second section are shifted upwardly one space, those in the second column are shifted downwardly one space and so on as viewed in FIG. 1, with the lead blocks in the tenth column being shifted into the left-hand end of the second section.

It appears from FIGS. 4, 5 and 6 that the supporting blocks 10 are each time moved one step by means of hydraulic cylinders with pistons. FIGS. 4 and 5 show the cylinder 13 with piston 14 for the simultaneous movement to the right of all supporting blocks which are found in the straight second section of the endless path. To move the supporting blocks in the meander-shaped first section of the path the cylinders 15, 16, 17 are provided and for the movement of a supporting block from the second section of the path towards the station 11 and vice versa the cylinder 18 is used (FIG. 6). In the embodiment the cylinders 13, 15, 16, 17, 18 are double acting. This is not always necessary. In some cases it may be preferable to replace the double acting cylinders by two oppositely operating single acting cylinders.

The cylinders 13, 15, 16, 17, 18 are mounted in the intermediate frame 2 located between the table top 4 and the base frame 1 (FIG. 6). The piston 14 is provided with a piston rod 19, on which a catch in the shape of a vertical pin 20 is attached. This pin extends through a slot of an upper plate 21 of the intermediate frame 2 and through a slot of the bottom 6 of the box-shaped table top 4 into a hole of a bar 23 mounted for longitudinal reciprocation in the table top 4. The bar 23 carries a block 24 provided with a pawl 26 which is loaded by a weight 25 and is adapted to engage each time the rear side of the last supporting or combined supporting-work block 10 of the row of blocks found in the straight second section of the path and to move upon the movement of the piston 14 to the right said entire row of supporting blocks one step to the right. In the same manner the pistons of the cylinders 16, 17 and 18 are coupled with bars mounted for longitudinal reciprocation in the table top 4. The bar coupled with the piston of cylinder 17 is provided in the points 27a, 27b, 27c, 27d and 27e shown in FIG. 6 with pawls, each of which has the task to move one supporting block one step to the left. Again in the same way the piston of cylinder 16 is coupled with a bar having four pawls attached thereto in the points 28a, 28b, 28c and 28d and adapted each to move one supporting block to the left. The bar coupled with the piston of cylinder 18 carries two pawls of which the one positioned in point 29a is used to move a supporting block from the straight second section of the path towards the station 11 and the other one which is positioned in points 29b is used to return said supporting block to said second section of the path.

The piston of cylinder 15 drives a toothed rack 30 which in its turn drives a number of toothed wheels 30a, 30b, 30c, 30d and 30e. Each one of these toothed wheels is integral with a rope pulley 31a, 31b, 31c, 31d and 31e, respectively, and is free to rotate about a vertical shaft 32 (FIG. 7). A rope 33a-33e is put around each rope pulley 31a-31e and it also extends around a second rope pulley 34a-34e, so that each rope has two oppositely reciprocating parts attached in points 35'a-35'e and 35''a-35''e of each one of these rope parts is a catch which in the mentioned way is coupled with a bar 36'a-36'e, 36''a-36''e which is mounted for movement at right angles to the front edge of the assembly table and is provided in the points 37'a-37'e and 37''a-37''e with a pawl to move the supporting blocks situated in the meander-shaped first section of the path in directions at right angles to the front edge of the table. The order of succession, in which the cylinders 13, 15, 16, 17, 18 are operative is the following one.

In the condition shown in FIG. 1 first the supporting block 10 which is found in the station 11 is returned to the straight second section of the path by the pawl 29b driven by the piston of cylinder 18 (FIG. 6). Thereupon the supporting blocks situated in said second piston of the path are moved one step to the right by the piston 14 of cylinder 13. At the same time the pistons of cylinders 16 and 17 move all those supporting blocks of the meander-shaped first section which are marked with arrows in FIG. 1 one step to the left. Thereafter all supporting blocks situated in the straight or columns of the meander-shaped section of the path are moved by the piston of cylinder 15 one more step either towards the rear edge or towards the front edge of the assembly table, as indicated by arrows in FIG. 1. Finally, the next supporting block is forced by the piston of cylinder 18 out of the second section of the path into the station 11, whereupon the cycle is repeated.

For driving the pistons contained in the cylinders 13, 15, 16, 17, 18 a number of hydraulic systems as illustrated in FIG. 8 may be used. FIG. 8 relates only to the hydraulic driving system associated with the piston 14 of cylinder 13 which is coupled with the supporting or the combined supporting-work blocks of the straight second section of the path (FIGS. 4, 5). The space 13a of said cylinder is connected by a conduit 38 to a cylinder 39 containing a piston 40 which is driven to the right by a cam disc 42 by way of a lever 41. The space 13b of cylinder 13 is connected by a conduit 43 with a cylinder 44 containing a piston 45 which is forced via lever 46 by a second cam disc 47 to the right. The cam discs 42 and 47 are fixed on a common shaft 49 driven by an electromotor 48. The conduit 38 is connected through a safety-valve 50 with a discharge conduit 52 leading to a liquid reservoir 51. The conduit 43 communicates with the discharge conduit 52 via a safety-valve 53. Furthermore the conduits 38 and 43 are connected through check valves 54 and 55 to the pressure conduit 56 of a pump 57, of which the suction conduit 58 starts in the reservoir 51. A check-valve 61 is provided in the pressure conduit 56 between the pump 57 and a pressure tank 59 containing a gas cushion 60 and connected to conduit 56. Finally the pressure conduit 56 is connected with the discharge conduit 52 through an over-pressure valve 62. The over-pressure valve 62 is forced open at a lower over-pressure than the safety valves 50 and 53, so that in normal operation the permanent over-pressure in the conduits 38, 43 and the cylinders 13, 39 and 44 is determined by the adjustment of the over-pressure valve 62.

The motor 48 is started by means of a push button 63. Thereafter the circuit of the motor is kept closed by a contact 64 bridging the push button 63 until the cam 65 of a cam disc 66 fixed on the shaft 49 pushes the contact 64 open.

When the motor 48 is switched in the piston 40 is forced to the right. The result thereof is that also the piston 14 and the supporting blocks 10 coupled therewith are moved to the right. At the same time the piston 45 is moved to the left. The pistons 40 and 45 are kept pressed against the levers 41, 46 and the cam discs 42, 47 by the over-pressure prevailing in the pressure conduit 56 and the pressure tank 59. This over-pressure prevails also via the check valves 54, 55 in conduits 38 and 43.

If during the further rotation of the cam discs the piston 40 is moved to the left and the piston 45 is moved to the right, the piston 14 with pin 20 is moved to the left in order to prepare the next step of the supporting blocks 10.

If the supporting blocks 10 get jammed due to a fault during the stepwise movement the pressure in conduit 38 will rise considerably as a result of the continuing movement of piston 40. In that case the safety valve 50 is opened so that liquid is forced from the conduit 38 to the reservoir 51. Thereafter the conduit 38 contains too little liquid. However, this shortage will be made up by liquid from the pressure tank 59 and the pressure conduit 56, as soon as the piston 40 is allowed to move to the left. The same applies to the conduit 43 in case the piston 14 moving to the left stops prematurely. The relative positions of the pistons 14, 40 and 45 will thus be corrected time and again after the occurrence of a fault.

The pump 57, the pressure conduit 56, the pressure tank 59, the check valve 61 and the over-pressure valve 62 can be dispensed with, when in the conduits 38 and 43 there is no permanent over-pressure to drive the pistons 40 and 45 back. Then the pistons 40 and 45 must be loaded by springs 67 and 68 and the conduits 38 and 43 must communicate via the check valves 54 and 55 and a suction conduit 69 with the liquid reservoir 51. A shortage of liquid in conduits 39 or 43 and the cylinder spaces 13a, 39 or 13b, 44 connected thereto will then be made up via the check valve 54 or 55 and the suction conduit 69 by liquid sucked out of the reservoir 51, whereas, when the piston 14 gets jammed in one or the other direction during its stroke, the safety valve 50 or 53 starts to operate.

The cam discs corresponding to the cam discs 42, 47 and used for the other cylinders 15, 16, 17 and 18 are also fixed to the shaft 49 and they are each one in regard to the placed others unders predetermined angles.

Instead of the hydraulic circuit shown in FIG. 8 the hydraulic circuit illustrated in FIG. 9 may be used. Therein two cam discs 75, 76 for each reciprocation of one or more rows of supporting blocks are fixed on the shaft 74 driven by a motor (not shown). Each one of these cam discs drives a plunger piston 79, 80 contained in a cylinder 77, 78 against the liquid pressure in said cylinder. The active space 81 of the cylinder 77 is connected by conduit 82 with the space 83 of the cylinder 84 containing the piston 85 for driving the supporting blocks, whereas the space 86 of the cylinder 78 is connected by conduit 87 to the space 88 of said cylinder 84.

The cylinder spaces 81 and 86 are interconnected by a coupling 91 and check valves 89 and 90 closing towards said spaces. The conduits 82 and 87 are connected via over-pressure or safety valves 92 and 93 with a discharge conduit 95 leading to a liquid storage tank 94. Furthermore, they communicate each with an over-pressure relay 96, 97 which opens at a predetermined over-pressure in the conduit 82, 87 an electrical contact 98, 99 which then interrupts the circuit of the electromotor, so that the movements of the supporting blocks of the assembly table are stopped.

Liquid from tank 94 is pumped by a pump 100 via a check valve 101 into a supply conduit 102 and hence via an over-pressure valve 103 and the discharge conduit 95 back to the tank 94. The supply conduit 102 is in open connection with an expansion vessel 104 and it is also connected with a coupling conduit 91 via a check valve 105. The force of the spring of the check valve 105 is lower than that of the over-pressure valves 92, 93 and 103.

Each plunger piston 79, 80 is provided with a pin 106, 107 by means of which it opens the check valve 89, 90 at the end of its active stroke.

If the plunger piston 79 is forced to the right by the cam disc 75, the liquid pressure in conduit 82 and cylinder space 83 rises, so that also piston 85 is moved to the right and the respective supporting blocks are moved one step. The moving piston 85 forces liquid out of the cylinder space 88 and through conduit 87 into the cylinder space 86, so that the plunger piston 80 is kept pressed against the cam disc 76 which in the meantime has been rotated on. Finally, said piston assumes its extreme left-hand position.

Should the piston 85 during its operation and movement to the right, get jammed due to some trouble the pressure in conduit 82 will rise so high that the over-pressure relay 96 comes in operation, whereby the contact 98 is opened, so that the motor stops. However, before this happens the pressure could, during a short time, become so high, as to force open the over-pressure valve 92 so that liquid is discharged from the pressure conduit 81, 82, 83 by way of said valve and conduit 95 to the tank 94.

After the trouble has been removed and thereafter the motor has been started again, the plunger piston 79 is forced further to the right by the cam disc 75. In that case the piston 85 will not reach its right hand end position, should no further measures be taken, since a certain quantity of liquid has been leaked away from the pressure circuit 81, 82, 83. However, in its end position the plunger piston 97 pushes the check valve 89 open with its pin 106, so that liquid from the expansion vessel 104 is forced into the conduit 82 and the cylinder space 83 through the supply conduit 102, via the check valve 105, through the coupling conduit 91, via the opened check valve 89 and through the cylinder space 81. This make-up liquid has the pressure defined by the force of the spring on the over-pressure valve 103 and this pressure is sufficient to force the piston 85 into its right hand end position. Consequently, after each active stroke of a plunger piston 79, 80 the pressure conduit 81, 82, 83 and 86, 87, 88 controlled by said piston is again entirely filled up with liquid, should liquid have been leaked away therefrom. It will be obvious, that during the active stroke of plunger piston 80 the piston 85 is moved to the left and that during and after a fault the same correction will take place.

FIG. 3 shows that the base frame 1 is provided, at its rear edge, with fittings 70 having horizontal grooves 71. For instance, bins for components and tools may be fixed in these fittings. It is also possible to fix in said grooves an auxiliary table top provided with auxiliary blocks and a frame provided with driving cylinders for moving components within the reach of the worker, as is illustrated in dotted lines and indicated by 72 and 73.

It is an advantage of the assembly table according to the invention that the supporting blocks and the work blocks can be combined to one integral supporting work block. Another advantage is that the supporting blocks need not be turned when moving in their path. Owing thereto the intermediate spaces between successive supporting blocks can be reduced to narrow gaps so that the filling factor of the table will be a maximum. Furthermore, the supporting blocks may have square or rectangular shapes.

Still another advantage of the supporting-work blocks moving in side guides is that the lower surface of the blocks, when at the station, can be kept free, so that, when said blocks have suitable holes under the objects lying on them, work on said objects can also be done from below.

What I claim is:

1. An assembly table for precision mechanisms, comprising a frame, a table top, guides provided in said table top, a plurality of supporting blocks which are slidably mounted in said guides for stepwise movement in an endless path, said blocks passing during their movement one after the other at least one station where components for mechanisms carried by the supporting blocks are subjected to treatment, detachable fastening means securing the table top to said frame and enabling said top to be removed from and reinstalled on said frame together with the supporting blocks as an integral part, means for driving the supporting blocks, and at least two sets of interengageable and disengageable coupling members for coupling the supporting blocks with the driving means, one coupling member of each set being permanently provided in said table top and another coupling member of each set being permanently provided in the table top.

2. An assembly table as claimed in claim 1, in which said frame consists of a lower part and an upper part which is detachably secured to said lower part and in which the driving means are constituted by a hydraulic driving system including hydraulic auxiliary cylinders with pistons for driving the supporting blocks through said sets of interengaged coupling members and means for feeding and controlling said cylinders, said auxiliary cylinders with pistons being mounted in the upper part of said frame and said feed and control means being accommodated in the lower part of said frame.

3. An assembly table as claimed in claim 2, in which the feed and control means accommodated in the lower part of said frame includes main cylinders with pistons and simultaneously electrically driven rotatable cam discs which are each adapted to drive an individual one of said main pistons, each one of said main cylinders having an active space which is connected by a conduit to one of said auxiliary cylinders accommodated in the detachable upper part of the base frame.

4. An assembly table as claimed in claim 2, in which each set of interengageable and disengageable coupling members consists of a slidable strip mounted for longitudinal reciprocation in the table top and provided with at least one catch for coupling said bar with at least one supporting block during its forward movement on one hand and a vertical coupling pin extending through a hole of said strip and secured to the piston of an auxiliary cylinder accommodated in the upper part of the base frame on the other hand.

5. An assembly table as claimed in claim 1, in which the endless path of the supporting blocks extends within a rectangle except at the site of each station, where components carried by said blocks are subjected to treatment, at which site said path projects at a right angle from the leg of said rectangle facing the station.

6. An assembly table as claimed in claim 1, in which the frame is provided with means for the detachable mounting, at a certain distance above the table top, of bins for tools and spare parts.

7. An assembly table as claimed in claim 1, in which the base frame is provided with means for the detachable mounting, at some distance above the table top, of an auxiliary table top comprising auxiliary supporting blocks and means for driving said auxiliary blocks along an endless path, said auxiliary supporting blocks bringing tools or spare parts to a site within the reach of the operator at at least one station, where the components carried by the supporting blocks of the main table top are subjected to treatment.

8. An assembly table as claimed in claim 3, in which a hydraulic feed circuit is provided and kept under a predetermined over-pressure, a feed conduit is provided between said feed circuit and the active cylinder space of each main cylinder accommodated in the lower part of the base frame, a check-valve closing towards said cylinder space is provided in said feed conduit, said check valve being adapted to be opened by the cam driven piston of said main cylinder at the end of its active stroke, and in which an additional spring loaded check-valve closing towards the feed circuit is provided in each one of said conduits connecting said main cylinder to said auxiliary cylinders, the arrangement being such that the force exerted by the spring on the additional check-valve is smaller than the opposing force exerted thereon by the liquid pressure obtaining in the feed circuit.

9. In an assembly table for precision mechanisms, the combination of:

a supporting frame, a table top assembly supported by said supporting frame and defining a work station, and locating means for detachably locating said table top assembly on said supporting frame so that the table top assembly may be removed and replaced as a unit for production purposes;

said table top assembly including guide means for defining and endless path leading to and from said work station and a plurality of supporting blocks engaged by said guide means and adapted to be moved in step-by-step fashion through said endless path, and at least first and second motion-transmitting members associated with said guide means to effect the step-by-step motion of said supporting blocks; and drive means carried by said supporting frame for moving said first and second motion-transmitting members, said drive means including first and second coupling members which respectively disengage from and interengage with said first and second motion-transmitting members when said table top assembly is removed and replaced.

10. In an assembly table as defined in claim 9 wherein said first and second motion-transmitting members are guided for reciprocation in mutually orthogonal directions and include pawl devices engageable with said supporting blocks.

11. In an assembly table as defined in claim 10 wherein said supporting frame comprises a base frame structure and an intermediate frame structure, and locating means detachably locating said intermediate frame structure on said base frame structure so that said intermediate frame structure may be removed and replaced as a unit for production purposes, said drive means being carried by said intermediate frame structure.

12. In an assembly table as defined in claim 11 wherein said drive means includes first and second hydraulic piston/cylinder devices each of which includes a reciprocable piston rod carrying one of said first and second coupling members, and fluid supply means carried by said base frame structure for controllably supplying hydraulic fluid to said piston/cylinder devices.

* * * * *